(12) United States Patent
Ikegami et al.

(10) Patent No.: US 6,553,938 B2
(45) Date of Patent: Apr. 29, 2003

(54) PET SHEET

(75) Inventors: Takeshi Ikegami, Kagawa (JP); Kengo Ochi, Kagawa (JP)

(73) Assignee: Uni-Charm Petcare Corporation, Tokyo (JP)

( * ) Notice: Subject to any disclaimer, the term of this patent is extended or adjusted under 35 U.S.C. 154(b) by 0 days.

(21) Appl. No.: 09/848,649

(22) Filed: May 3, 2001

(65) Prior Publication Data

US 2001/0042518 A1 Nov. 22, 2001

(30) Foreign Application Priority Data

May 19, 2000 (JP) ........................................ 2000-148745

(51) Int. Cl.[7] ............................ A01K 29/00; A61F 13/15
(52) U.S. Cl. ...................................... 119/161; 119/28.5
(58) Field of Search ................................ 119/161, 28.5; 604/358, 378, 385.01, 385.04, 385.14, 385.16

(56) References Cited

U.S. PATENT DOCUMENTS 3,857,394 A * 12/1974 Alemany .................... 128/835
4,610,679 A * 9/1986 Matsushita .................. 604/369
4,994,052 A * 2/1991 Kimura ...................... 604/358
5,935,118 A * 8/1999 Gryskiewicz et al. .. 604/385.02

FOREIGN PATENT DOCUMENTS

DE 2748348 5/1979
EP 0698341 A1 2/1996

OTHER PUBLICATIONS

Patent Application Publication No. US 2001/0027304 A1, Mayer, Oct 4, 2001.*

* cited by examiner

Primary Examiner—Yvonne Abbott
(74) Attorney, Agent, or Firm—Butzel Long

(57) ABSTRACT

A pet sheet includes a hydrophilic top sheet arranged on the absorbing material, wherein a flap which is formed at least adjacent a peripheral edge of the absorbing material and opens toward the center of the absorbing material. The flap has an upper surface of hydrophilic.

15 Claims, 16 Drawing Sheets

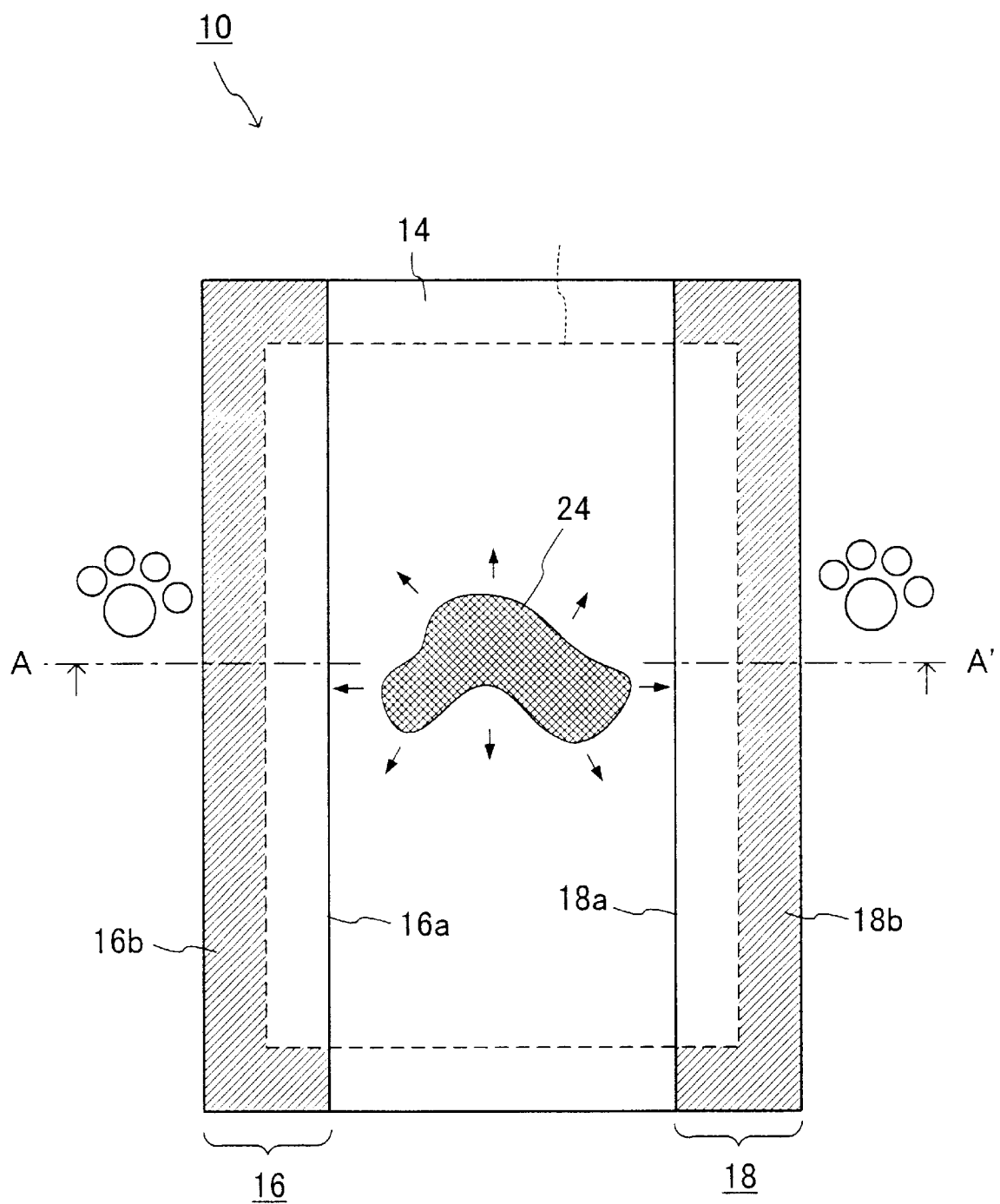

PET SHEET

CROSS REFERENCE TO RELATED APPLICATION

This application claims the priority of Application No. 2000-148745, filed May 19, 2000 in Japan, the subject matter of which is incorporated herein by reference.

TECHNICAL FIELD OF THE INVENTION

The present invention relates to a pet sheet which is usually placed and used on a floor or the like for disposing of excreta of pets which are kept indoors.

BACKGROUND OF THE INVENTION

A conventional pet sheet includes, for example, a hydrophilic top sheet which absorbs liquid, an under sheet or back sheet having water repellency (water resistance), and an absorbing material arranged between those two sheets. Urine excreted from a pet passes through the hydrophilic top sheet and is absorbed in the absorbing material. If urine is excreted over the capacity of the absorbing material, the urine may be leaked out of the pet sheet. In another case, urine slips on the top sheet, reach a peripheral edge of the pet sheet and may be leaked out of the sheet. Accordingly, a flap may be provided on the top sheet to prevent urine from leaking out of the pet sheet.

However, when such a flap is provided on the top sheet, another problem arises, in which scattered urine remains on the flap. As a result, when the pet sheet is disposed, such remaining urine on the flap may get the users hands and/or the floor dirty.

OBJECTS OF THE INVENTION

Accordingly, an object of the present invention is to provide a pet sheet in which it can be prevented that urine remained on a flap get users hands and/or a floor dirty.

Additional objects, advantages and novel features of the present invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

According to a first aspect of the present invention, a pet sheet includes a hydrophilic top sheet arranged on the absorbing material, wherein a flap which is formed at least adjacent a peripheral edge of the absorbing material and opens toward the center of the absorbing material. The flap has an upper surface of hydrophilic. Urine put on the flap is absorbed therein, so that it can be prevented that urine remained on a flap get users hands and/or a floor dirty.

The flap may be made of a single sheet of non-woven fabric. In this case, preferably, the flap has a lower surface coated with hydrophobic or water repellency material. The flap may be formed to have a double-layer structure in which an upper layer of hydrophilic and a lower layer of hydrophobic or water repellency.

The pet sheet may include a spacer arranged between the hydrophilic top sheet and flap to make a space therein. According to this feature, urine on the top sheet is prevented from flowing over flap, so that the urine can be trapped by the flap reliably. The pet sheet may have no extra intermediate material between the hydrophilic top sheet and the flap, so that the flap is maintained to be flat to the hydrophilic top sheet. According to this feature, pets do not trip over the flap.

Preferably, a plurality of the flaps is formed on the hydrophilic top sheet. Furthermore, the flaps may be formed on the entire surface of the absorbing material, thereby increasing the efficiency of stopping the urine. Thus, the urine which flows over the first flap can be stopped by the next flap.

In addition, preferably, at least one end of each of the flaps adjacent side edges of the sheet, which is opposite to a free or open end thereof, is fixed to the hydrophilic top sheet along two directions. In the case where, for example, the absorbing material and the hydrophilic top sheet are rectangular, the flap is provided along at least one side of the absorbing material and the hydrophilic top sheet is fixed in angular C shape. Thus, even when a large amount of urine flows between the hydrophilic top sheet and the flap, the flap is not pushed down on the side of adhering section.

Furthermore, indentations can be formed at least at positions corresponding to the flaps adjacent of the side edges of the absorbing material. For example, the indentation is a groove formed along the flap. Forming such an indentation enables the urine which is going to flow to the outside to be efficiently stopped even in the case where there is little space between the flap and the hydrophilic top sheet. That is, the urine which flows toward the outside after entering the indentation, pushes up the flap when it flows over the indentation. Accordingly, the flap is raised by the pressure from the urine, showing its fundamental function. Thus, the urine which flows toward the outside is prevented from passing over the flap. Particularly, when the flap is formed so as to cover a part of the groove, the aforesaid effect can be brought to the fore.

Also, when the indentations are formed on the absorbing material so that a plurality of small areas is formed, in whichever direction the urine in the area is going to flow, the urine is reliably trapped by the adjacent indentation. Thus, the movement of the urine can be controlled, regardless of the direction of the flow of the urine. Furthermore, when the indentations are formed so that the small areas are formed on the entire surface of the absorbing material, the movement of the urine which slides and flows over the hydrophilic top sheet can be controlled, regardless of the position and the direction in which the urine is excreted.

BRIEF DESCRIPTION OF THE DRAWINGS

FIG. 1 is a plan view showing a structure of a pet sheet according to a first embodiment of the present invention;

FIG. 2A and FIG. 2B are partially sectional views taken on line A–A' of FIG. 1, wherein FIG. 2A shows a non-used state and FIG. 2B shows a used state;

FIG. 6A and FIG. 6B are partially sectional views taken on line A–A' of FIG. 5, wherein FIG. 6A shows a non-used state and FIG. 6B shows a used state;

FIG. 10A and FIG. 10B are partially sectional views taken on line A–A' of FIG. 9, wherein FIG. 10A shows a non-used state and FIG. 10B shows a used state;

DETAILED DISCLOSURE OF THE INVENTION

In the following detailed description of the preferred embodiments, reference is made to the accompanying drawings which form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present inventions. The following detailed description is, therefore, not to be taken in a limiting sense, and scope of the present inventions is defined only by the appended claims.

An embodiment of the present invention will be described hereinbelow using a rectangular pet sheet as an example. The invention is not limited to the shape, the size, and the like of the following described pet sheets, and modifications may be made in the invention according to the kind of the pet and the condition of use.

Figure 2A:
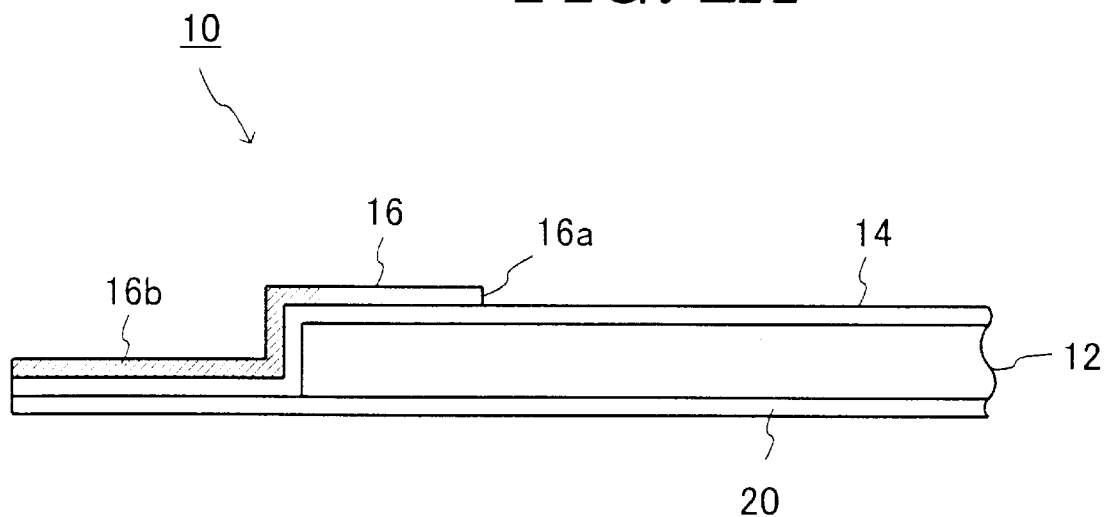
Figure 2B:
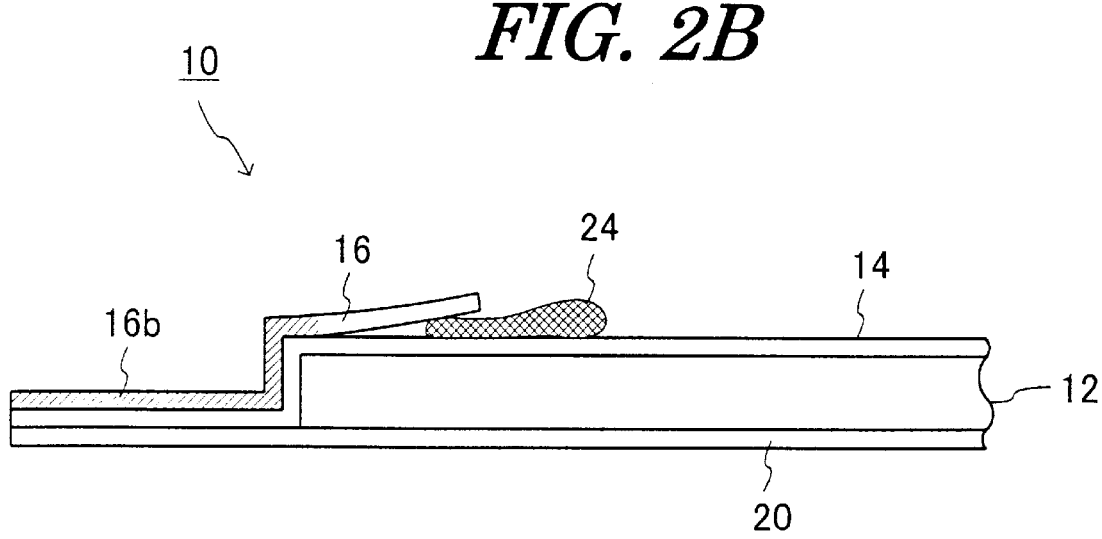

FIG. 1, FIG. 2A, and FIG. 2B are a plan view and cross sectional views, respectively, showing a pet sheet 10 according to a first embodiment of the present invention. The pet sheet 10 includes: an absorbing material 12 having a good absorbing property for liquid such as urine; a hydrophilic top sheet 14 arranged so as to cover the absorbing material 12; an under sheet or back sheet 20 having water repellency or water resistance, which is arranged so as to sandwich the absorbing material 12 between the under sheet 20 and the hydrophilic top sheet 14; and a pair of flaps 16 and 18 arranged at the rims on the long sides of the hydrophilic top sheet 14.

A material in which a super-absorbing polymer (SAP) is mixed with pulp or cotton and is then wrapped in a tissue or a non-woven fabric can be used as the absorbing material 12. The absorbing material 12 is arranged around the center of the hydrophilic top sheet 14 and the under sheet 20 and absorbs urine 24 or the like which is excreted from the pet.

The hydrophilic top sheet 14 can be formed of a non-woven fabric formed by a synthetic fiber such as a point bonded non-woven fabric formed from polypropylene (PP), a non-woven fabric including an absorbing fiber such as a rayon fiber, or a non-woven fabric formed only from the absorbing fiber. Furthermore, a micropore film having a number of micropores can also be used. A polyethylene (PE) film, a plastic sheet, or the like can be used as the under sheet 20.

The flaps 16 and 18 are arranged at peripheral ends or edges of on longer sides of the absorbing material 12. The flaps 16 and 18 are formed to have free ends or opening sections 16a and 18a, respectively, which are directed toward the center of the absorbing material 12. Since the flaps 16 and 18 are provided at peripheral ends or edges of the hydrophilic top sheet 14, the urine 24 which is not absorbed in the absorbing material 12 and which flows sideways on the hydrophilic top sheet 14 can enter between the flaps 16 and 18, thus stopping the flow of the urine 24 there. The flaps 16 and 18 are designed to have a rigidity such that they easily rise when the urine 24 enters therein. For example, the rigidity is set according to a measurement of 50 mm or less obtained by a cantilever method.

Figure 3A:
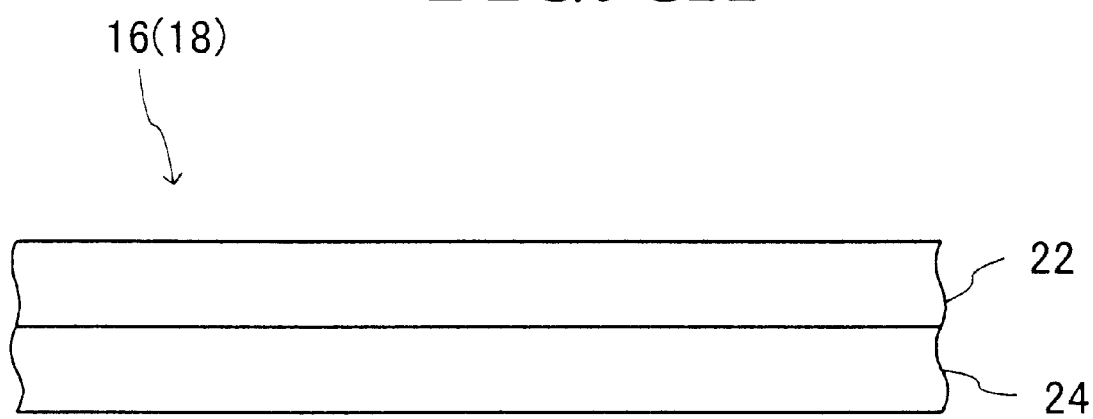
FIGS. 3A and 3B are cross-sectional views showing examples of structure of a flap, shown in FIG. 1, wherein FIG. 3A

FIG. 3A show the structure of the flap 16 (18). The flaps 16 and 18 includes a lower surface 23, facing the top sheet 14, having non-water-permeability or water repellency property and an upper surface 22 having a hydrophilic property. In this embodiment, each of the flaps 16 and 18 is made of a single sheet of a point bonded non-woven fabric. To fabricate flaps 16 and 18, at least first and second carding machines, which laminates fibers uniformly. For example, water repellency (hydrophobic) fibers are laminated with a first carding machine, then hydrophilic fibers or hydrophilic-treated hydrophobic fibers are laminated, and then those two laminated sheets are attached to each other in a heat embossing process.

Figure 3B:
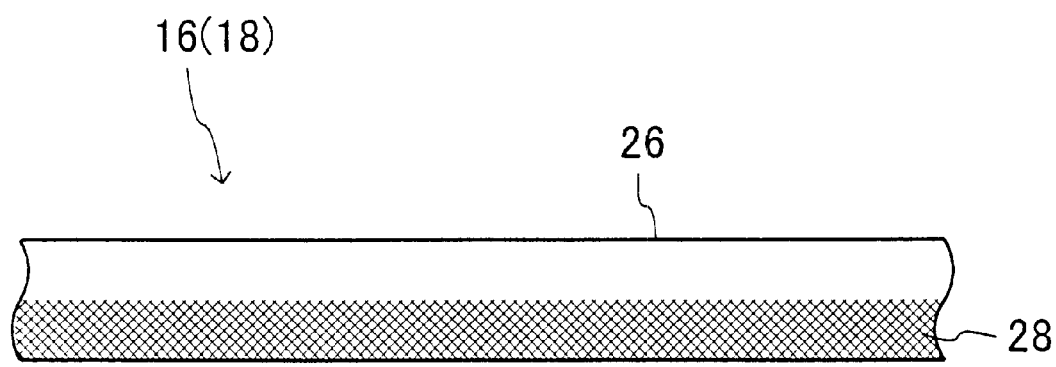

The flaps 16 and 18 can be formed to have a different structure from this embodiment, for example, a flap may have a double-layered structure, in which a hydrophilic layer and a hydrophobic layer are adhered to each other. As shown in FIG. 3B, each of the flaps 16 and 18 can be fabricated by coating a water repellent material 28 onto a hydrophilic sheet 26. The flaps 16 and 18 may have an upper layer of hydrophilic non-woven fabric, tissue or the like. The flaps 16 and 18 may have a lower layer of hydrophobic non-woven fabric, film, silicon coated layer, fluorine coated layer, or the like.

No extra intermediate material is arranged between the hydrophilic top sheet 14 and the flaps 16 and 18, and the flaps 16 and 18 are maintained to be flat to the hydrophilic top sheet 14 in an unused state. Therefore, the pet does not trip over the flaps 16 and 18.

The flaps 16 and 18 are fixed to the hydrophilic top sheet 14 at adhering sections 16b and 18b. The flaps 16 and 18 can be fixed to the hydrophilic top sheet 14 (pet sheet main body) using a hot melt adhesive, heat-sealing, or the like. In the drawings, the adhering sections 16b and 18b are shown by diagonally shaded areas.

The adhering sections 16b and 18b substantially form an angular C shape in plan view such that even if a large amount of urine 24 flows between the hydrophilic top sheet 14 and the flaps 16 and 18, the flaps 16 and 18 are not bent over towards the sides of the adhering sections 16b and 18b due to the flow of the urine 24. In addition, the shape of the adhering sections 16b and 18b of the flaps 16 and 18 is not limited to the angular C shape, and if they are fixed in two dimensions, an effect similar to the case of angular C shape can be obtained. Also, in the present embodiment, although the adhering sections 16b and 18b of the flaps 16 and 18 almost coincide with the ends of the absorbing material 12, the attachment position of the flaps 16 and 18 may overlap with an upper rim of the absorbing material 12. However, it is preferable that the adhering sections 16b and 18b of the flaps 16 and 18 be as near the rim (end) of the absorbing material 12 as possible for the purpose of stopping the flow of the urine 24.

Also, according to the embodiment, although the flaps 16 and 18 are made of a different material from the pet sheet main body (12, 14, and 20), the flaps 16 and 18 may be formed by rolling up the under sheet 20 toward the top sheet 14. In other words, the ends of the under sheet 20 may form the flaps 16 and 18.

When the above described pet sheet is placed and used on a floor or the like, a pet such as a dog straddles the pet sheet 10 and excretes the urine 24 or the like. The excreted urine 24 is absorbed in the absorbing material 12 through the hydrophilic top sheet 14. In this instance, the urine 24, which flows quickly in a lateral direction (a direction almost perpendicular to the long side), slides on the hydrophilic top sheet 14 and is going to flow out of the pet sheet 10. This urine 24 enters between the flap 16 (18) and the hydrophilic top sheet 14 and is stopped, as shown in FIG. 2B.

Figure 4:
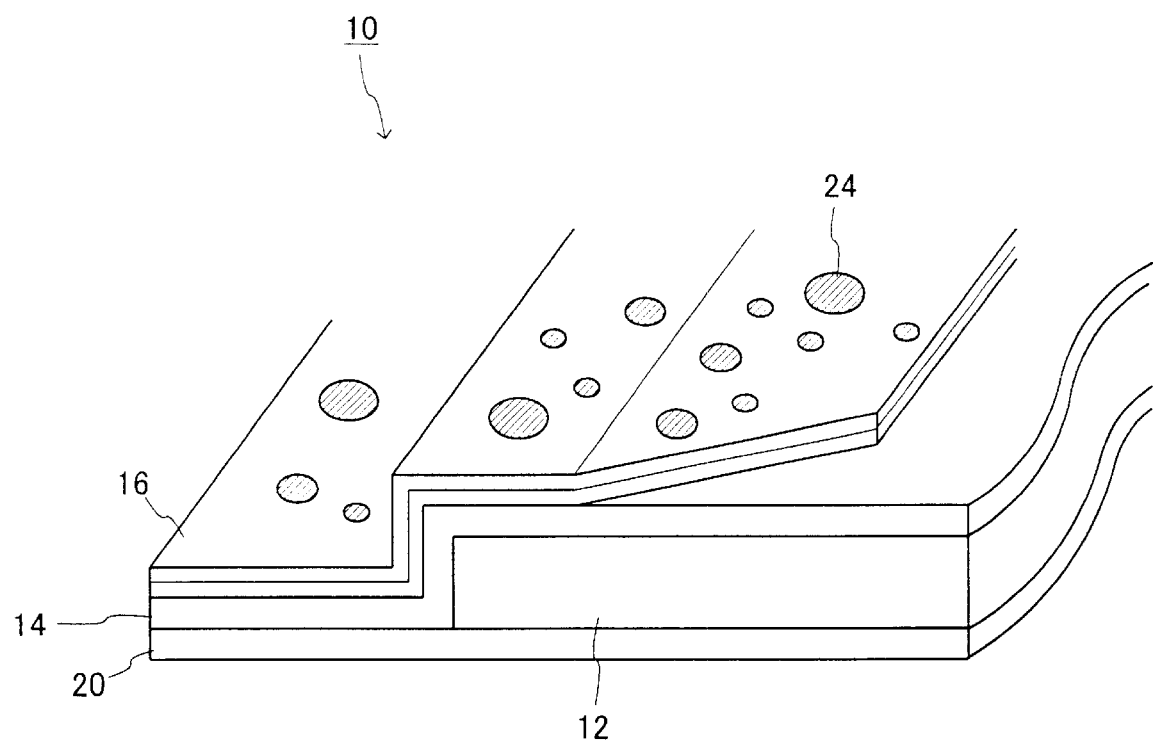
FIG. 4 is a perspective view showing how urine is absorbed in a flap, according to the present invention.

Further, according to this embodiment, the flaps 16 and 18 have lower surface of water repellent, so that the flaps 16 and 18 are prevented from being contact with the top sheet 14 when urine flows under the flaps 16 and 18. Therefore, the flaps 16 and 18 stand up and stop the urine flowing over. Further more, the flaps 16 and 18 have upper surfaces of hydrophilic, so that urine put on the flaps is spread thereon and absorbed therein, as shown in FIG. 4. As a result, it can be prevented that urine remained on the flaps 16 and 18 get users hands and/or a floor dirty.

Herein below, other embodiments of the present invention are described, in which flaps (16, 18 . . .) may be made of the same material and have the same structure as those in the first embodiment.

Figure 5:
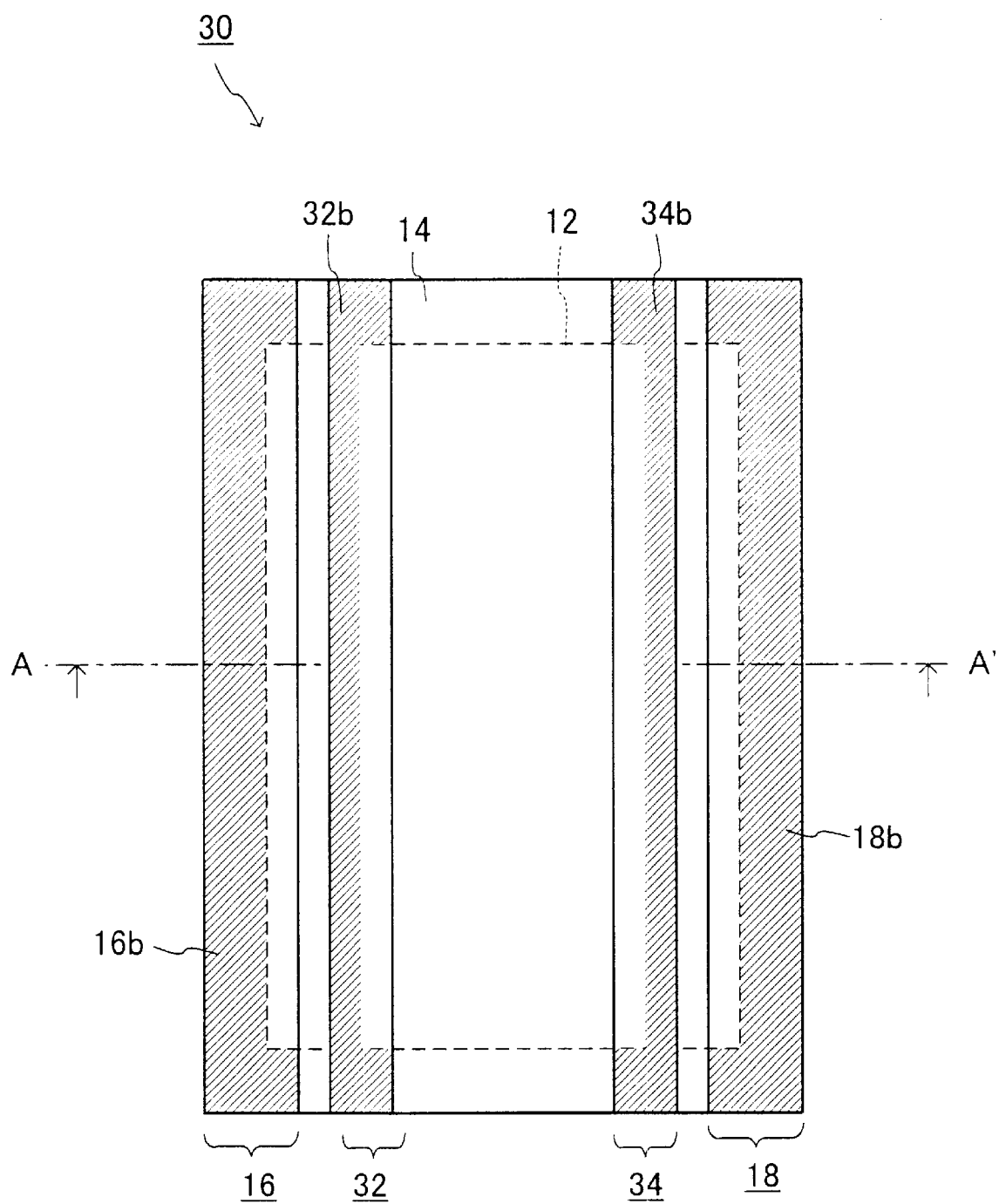
FIG. 5 is a plan view showing a structure of a pet sheet according to a second embodiment of the present invention.
Figure 6A:
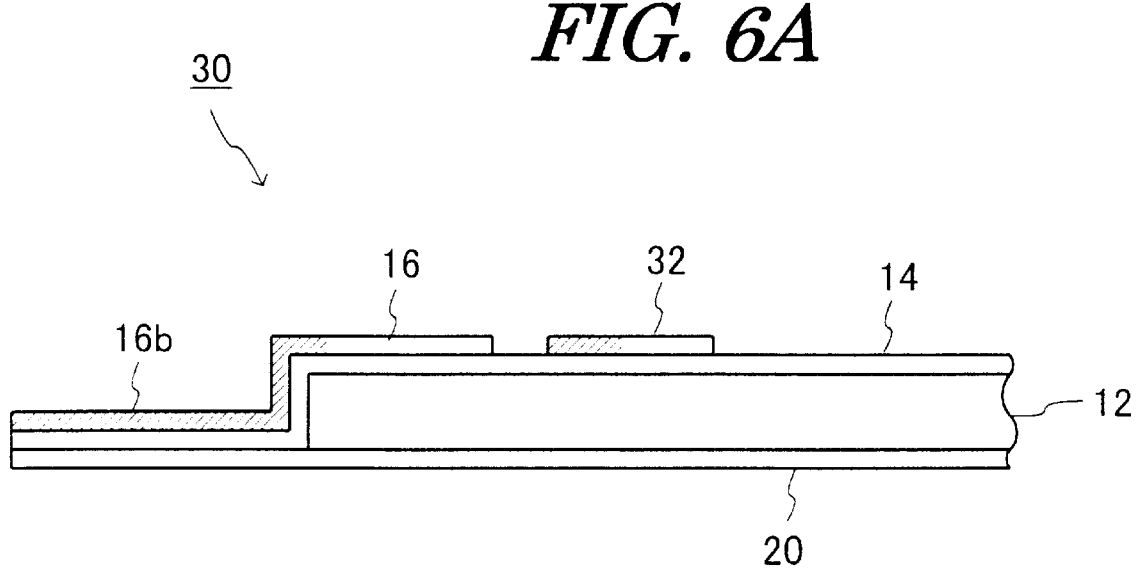
Figure 6B:
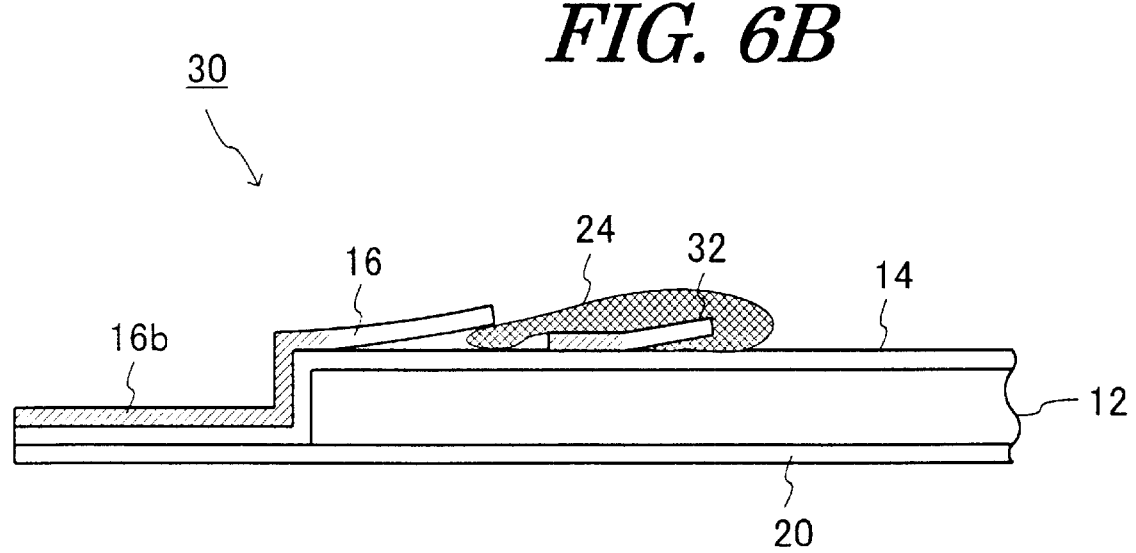

FIG. 5 and FIG. 6 are a plan view and a cross sectional view, respectively, showing a pet sheet 30 according to a second embodiment of the present invention. In the pet sheet 30 according to this embodiment, two flaps 32 and 34 are additionally provided for the pet sheet 10 according to the first embodiment. Composing elements identical to or corresponding to those in the first embodiment are given the same reference numerals and a description of previously described elements is omitted.

The pet sheet 30 includes: an absorbing material 12 having a good water-absorption property for liquid such as urine; a hydrophilic top sheet 14 arranged so as to cover the absorbing material 12; an under sheet (back sheet) 20 having water repellency or water resistance, which is arranged so as to sandwich the absorbing material 12 between the under sheet 20 and the hydrophilic top sheet 14; a pair of flaps 16 and 18 arranged at peripheral edges or ends of the hydrophilic top sheet 14; and the flaps 32 and 34 provided on the inner side of the flaps 16 and 18.

The flaps 16 and 18 are arranged around the peripheral edges of longer sides of the absorbing material 12 to have opening sections (free ends) directed toward the center of the absorbing material 12. The flaps 32 and 34 are arranged in parallel with a predetermined distance from the flaps 16 and 18, and are adhered and fixed to the hydrophilic top sheet 14 by adhering sections 32b and 34b in the same manner as the flaps 16 and 18. In the drawings, the adhering sections 32b and 34b are shown by diagonally shaded areas. The flaps 32 and 34 may principally have the same structure (including the material) as the flaps 16 and 18. Although the flaps 32 and 34 preferably have an upper surface of hydrophilic and a lower surface of hydrophobic or water repellent as well as the flaps 16 and 18, the flaps 32 and 34 may have upper surfaces of hydrophobic or water repellent. Namely, as long as the outmost flaps 16 and 18 have upper surfaces of hydrophilic, inner flaps 32 and 34 may have upper surfaces of hydrophobic or water repellent.

According to this embodiment, since the flaps 32 and 34 are additionally provided on the inner side of the flaps 16 and 18, which are located around the peripheral edges or ends of the absorbing material 12, the ability to stop the urine 24 is improved. Thus, the urine 24 which flows over the first flaps 32 and 34 may be efficiently stopped by the next flaps 16 and 18.

Figure 7:
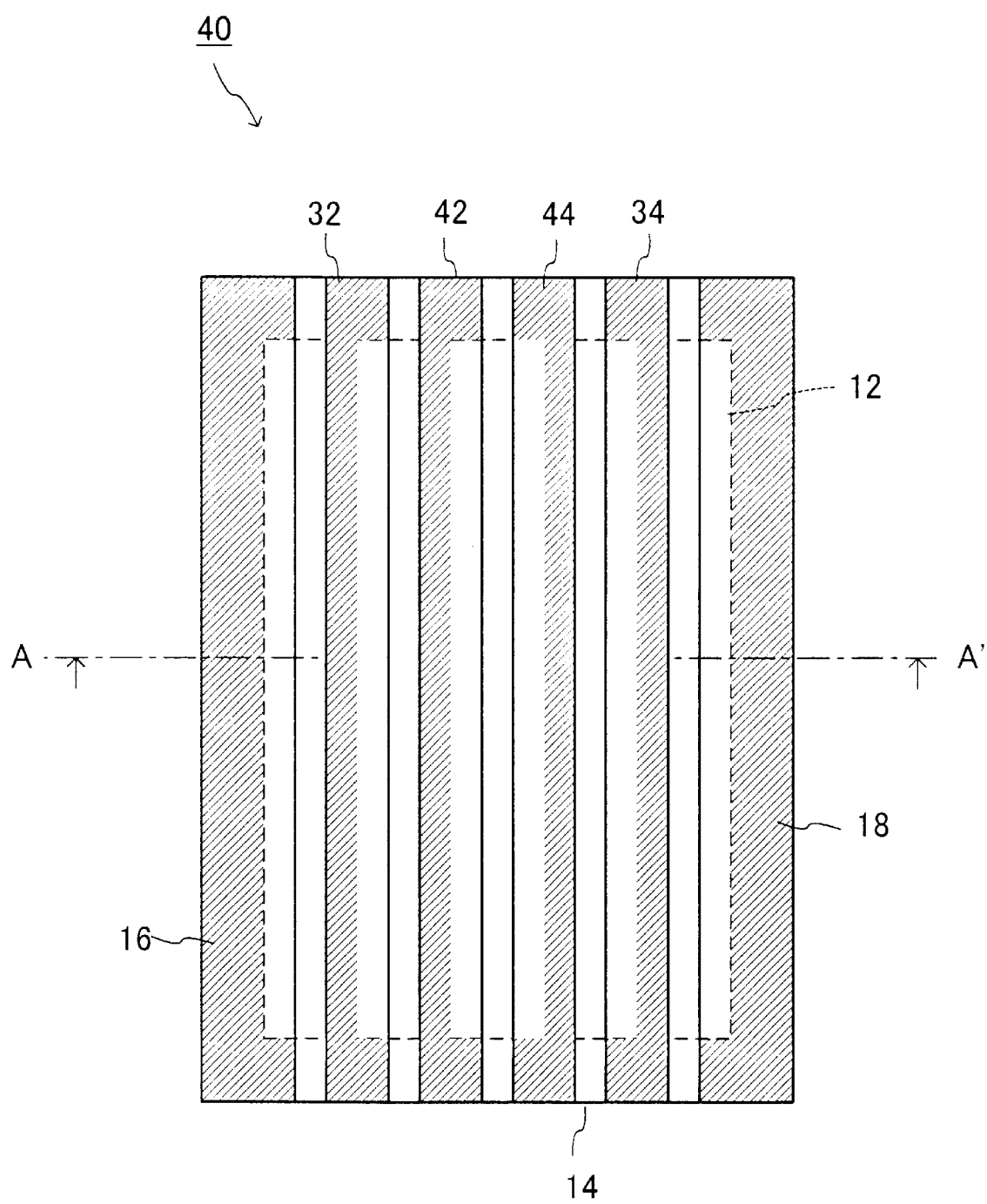
FIG. 7 is a plan view showing a structure of a pet sheet according to a third embodiment of the present invention.
Figure 8:
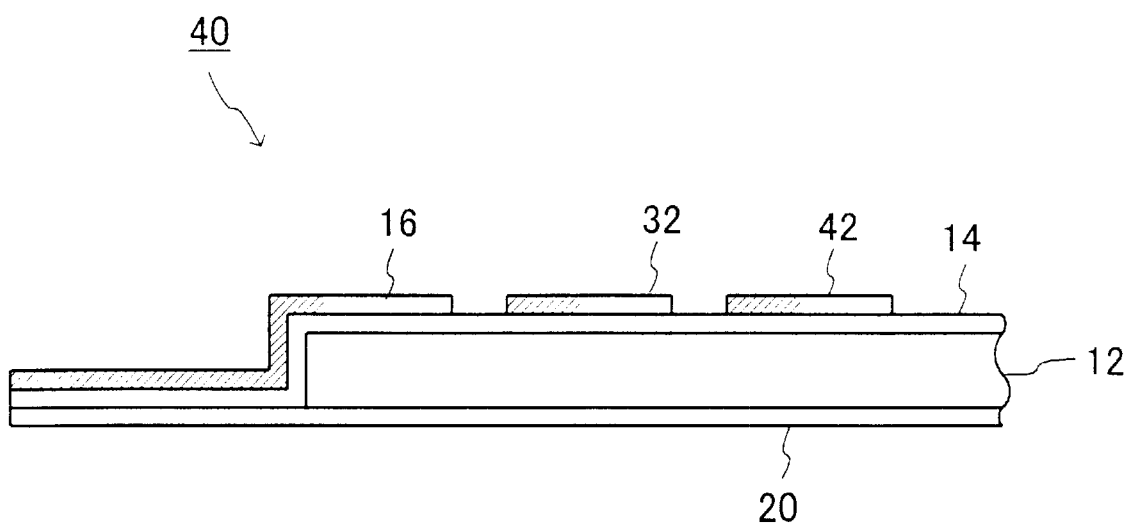
FIG. 8 is a partially sectional view taken on line A–A' of FIG. 7.

FIG. 7 and FIG. 8 are a plan view and a cross sectional view, respectively, showing a pet sheet 40 according to a third embodiment of the present invention. In the pet sheet 40 according to this embodiment, two flaps 42 and 44 are additionally provided on the inner side of the flaps 32 and 34 of the pet sheet 30 according to the second embodiment. In addition, composing elements identical to or corresponding to those in the above embodiments are given the same reference numerals and a description of previously described elements is omitted. In this embodiment, while six flaps are used in total, a fundamental concept is not related to the number of flaps, but to provide the flaps on the entire surface of the absorbing material 12.

The pet sheet 40 includes: an absorbing material 12 having a good water-absorption property for liquid such as urine; a hydrophilic top sheet 14 arranged so as to cover the absorbing material 12; an under sheet (back sheet) 20 having water repellency or water resistance, which is arranged so as to sandwich the absorbing material 12 between the under sheet 20 and the hydrophilic top sheet 14; a pair of flaps 16 and 18 arranged around peripheral edges or ends of the hydrophilic top sheet 14; the flaps 32 and 34 provided on the inner side of the flaps 16 and 18; and the flaps 42 and 44 additionally provided on the inner side of the flaps 32 and 34.

The flaps 16 and 18 are arranged at the peripheral edges or ends of longer sides of the absorbing material 12 to have opening sections (free ends) directed toward the center of the absorbing material 12. The flaps 32 and 34 are arranged in parallel with a predetermined distance from the flaps 16 and 18, and are adhered and fixed to the hydrophilic top sheet 14 at the adhering sections 32b and 34b in the same manner as the flaps 16 and 18. The flaps 42 and 44 are arranged in parallel with a predetermined distance from the flaps 32 and 34, and are adhered and fixed to the hydrophilic top sheet 14 in the same manner as the flaps 32 and 34. In the drawings, the adhering sections are shown by diagonally shaded areas. The flaps 32, 34, 42 and 44 may principally have the same structure (including the material) as the flaps 16 and 18. Although each of the flaps 32, 34, 42 and 44 preferably has an upper surface of hydrophilic and a lower surface of hydrophobic or water repellent as well as the flaps. 16 and 18, each of the flaps 32, 34, 42 and 44 may have an upper surface of hydrophobic or water repellent. Namely, as long as the outmost flaps 16 and 18 have upper surfaces of hydrophilic, inner flaps may have upper surfaces of hydrophobic or water repellent.

In this embodiment, since the flaps are provided on the entire surface of the absorbing material 12, the ability to stop the urine 24 is further improved, compared with the pet sheet 30 according to the second embodiment.

Figure 9:
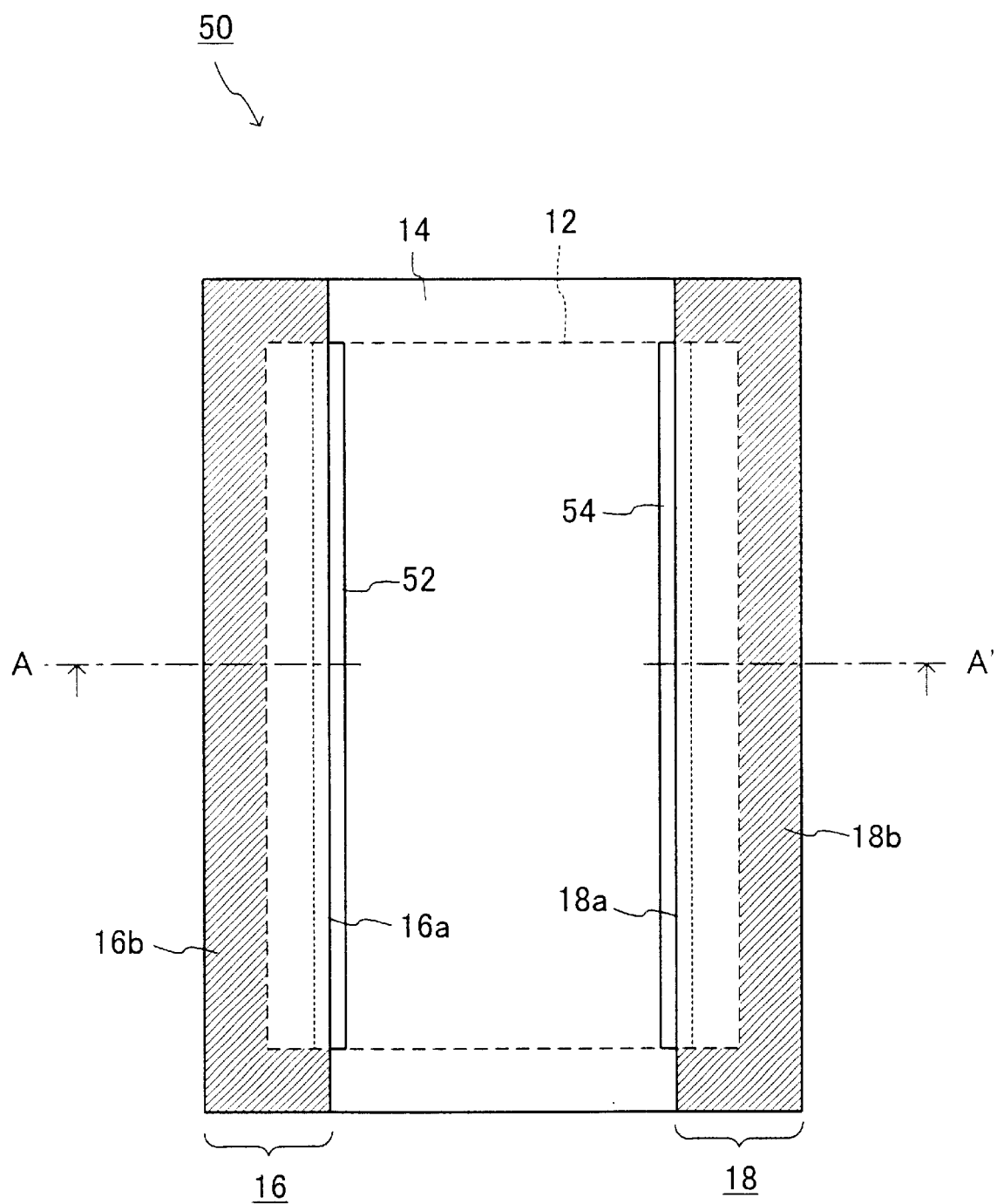
FIG. 9 is a plan view showing a structure of a pet sheet according to a fourth embodiment of the present invention.
Figure 10A:
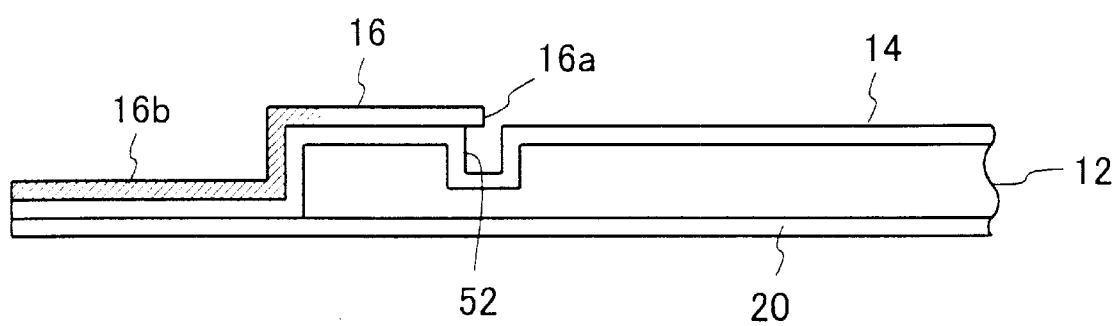
Figure 10B:
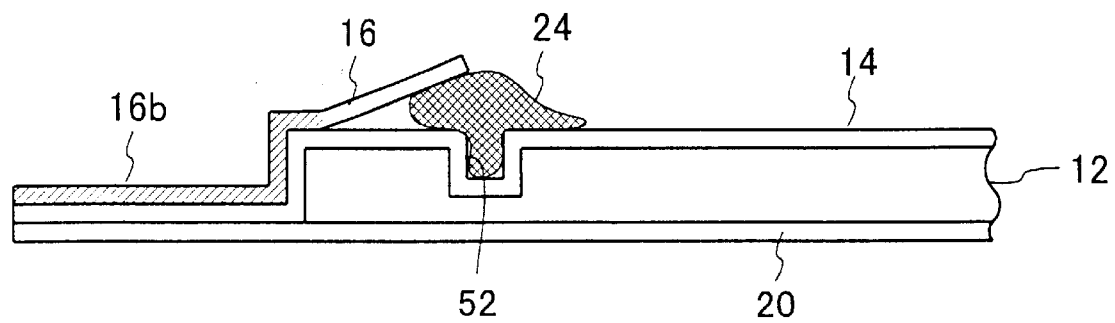

FIG. 9 and FIG. 10 are a plan view and a cross sectional view, respectively, showing a pet sheet 50 according to a fourth embodiment of the present invention. The pet sheet 50 according to this embodiment is constructed so as to provide grooves 52 and 54 for the pet sheet 10 according to the first embodiment. Since the other structures, materials, and the like are principally the same as those of the first embodiment, a description of previously described elements is omitted. In addition, composing elements identical to or corresponding to those in the foregoing embodiments are given the same reference numerals.

The pet sheet 50 includes: the absorbing material 12 having a good absorbing property for liquid such as urine; a hydrophilic top sheet 14 arranged so as to cover the absorbing material 12; an under sheet (back sheet) 20 having water repellency or water resistance, which is arranged so as to sandwich the absorbing material 12 between the under sheet 20 and the hydrophilic top sheet 14; and a pair of flaps 16 and 18 arranged at peripheral edges or ends of the hydrophilic top sheet 14. Also, grooves 52 and 54 are, formed at positions corresponding to the flaps 16 and 18 on the absorbing material 12 and the hydrophilic top sheet 14.

Preferably, the grooves 52 and 54 are positioned, for example, within 150 mm from the peripheral ends of the absorbing material 12. In addition, the grooves 52 and 54 can be formed by a method in which the absorbing material 12 is pressed with a roller in a well known embossing process, or by a method in which the thickness of only the parts of pulp constructing the absorbing material 12, which correspond to the grooves 52 and 54, is decreased. Preferably, each of the grooves 52 and 54 is provided continuously without any disconnection. Assuming that the grooves 52 and 54 are intermittently formed, for example, the length of each of the grooves 52 and 54 is set to 30 percent or more of the length of each of the flaps 16 and 18. The width of each of the grooves 52 and 54 is, for example, set to 3 mm or more in order to securely trap the urine 24.

Also, in this embodiment, the grooves 52 and 54 are arranged so that a half of the width thereof is overlapped by the flaps 16 and 18. Accordingly, the urine 24 which slides and flows on the hydrophilic top sheet 14 is prevented from flowing over the flaps 16 and 18 to the outside. In other words, the urine 24 which flows on the hydrophilic top sheet 14 enters the grooves 52 and 54 before reaching the flaps 16 and 18, and pushes up the flaps 16 and 18 from below, as shown in FIG. 8B. As a result, the flaps 16 and 18 are efficiently raised to stop the urine 24.

In this embodiment, as described above, since the two grooves 52 and 54 are provided on the absorbing material 12, the direction of the flow of the urine 24 which slides sideways can be controlled or limited. In other words, the urine 24 which flows laterally (in the direction perpendicular to the long side) is guided in the vertical direction (longitudinal direction) to some extent, and is spread out over a wide area of the absorbing material 12. Also, in the case where there is little space between the flaps 16 and 18 and the hydrophilic top sheet 14, the urine 24 which is going to flow to the outside can be efficiently stopped. That is, the urine 24 which flows toward the outside once entering the grooves 52 and 54, pushes up the flaps 16 and 18 when it flows over the grooves 52 and 54, and accordingly, the flaps 16 and 18 are raised, performing their fundamental function. Thus, the urine 24 which flows toward the outside is prevented from flowing over the flaps 16 and 18 without stopping.

Figure 11:
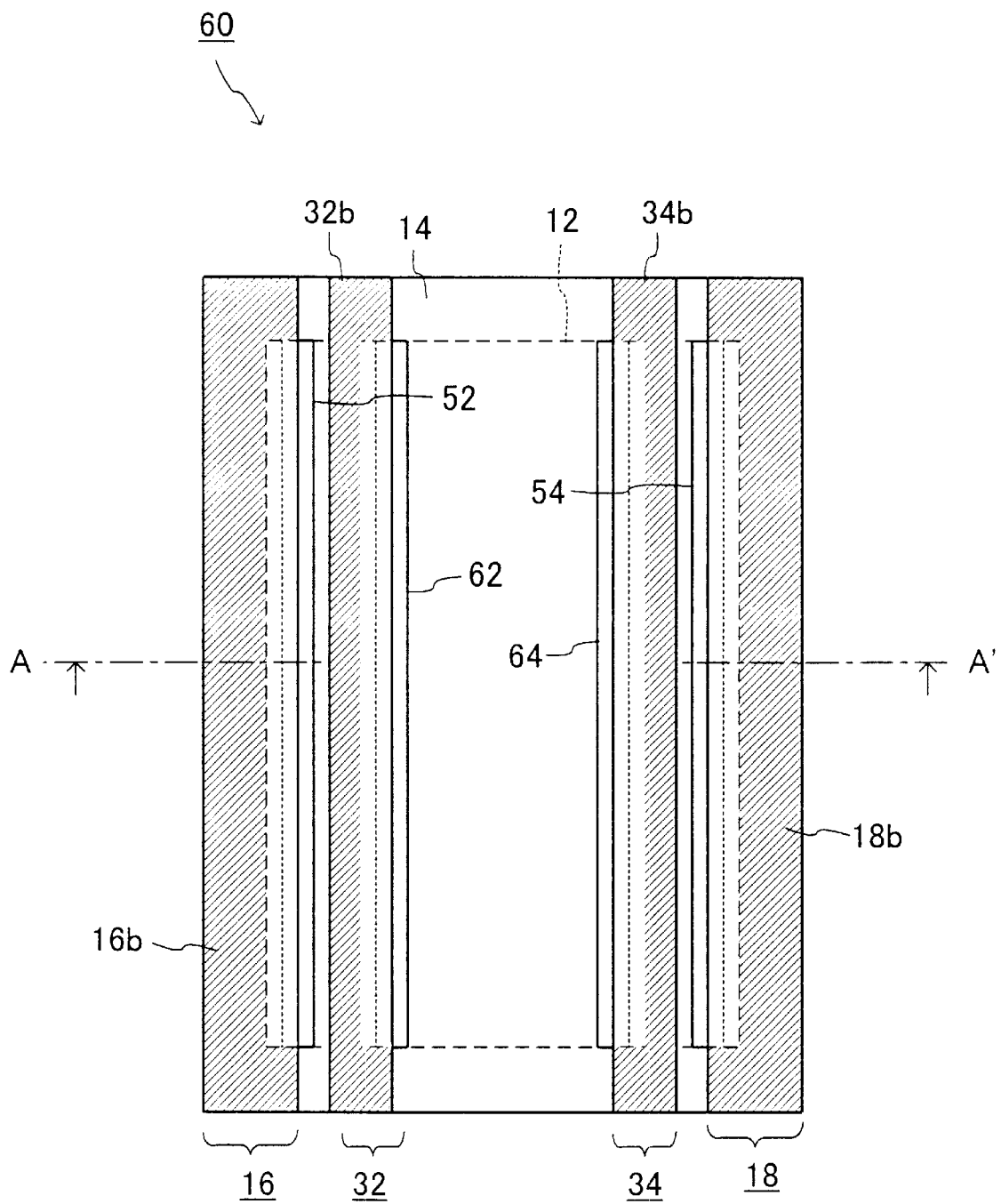
FIG. 11 is a plan view showing a structure of a pet sheet according to a fifth embodiment of the present invention.
Figure 12:
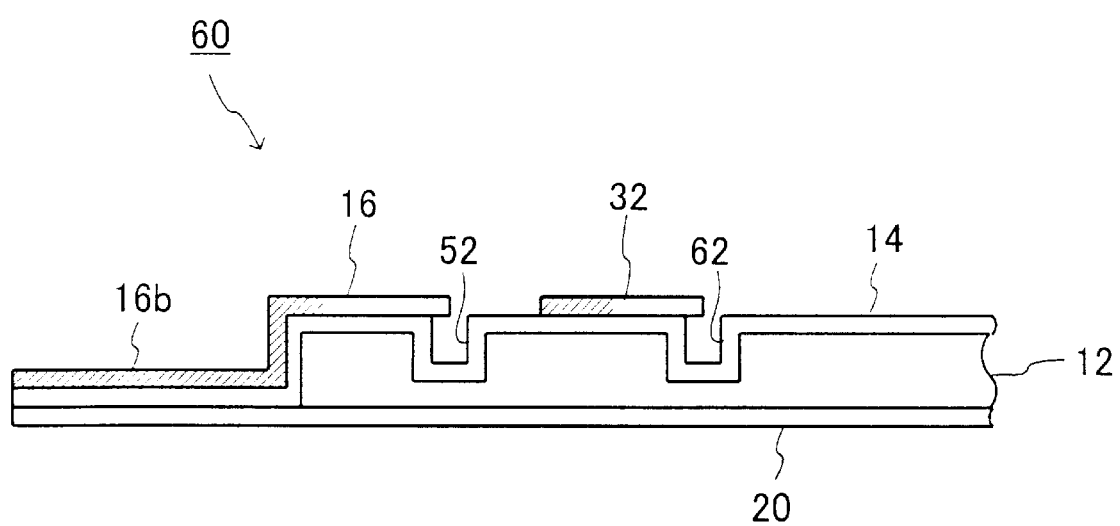
FIG. 12 is a partially sectional view taken on line A–A' of FIG. 11.

FIG. 11 and FIG. 12 are a plan view and a cross sectional view, respectively, showing a pet sheet 60 according to a fifth embodiment of the present invention. The pet sheet 60 according to this embodiment has both the features of the pet sheet 30 according to the second embodiment and the features of the pet sheet 50 according to the fourth embodiment. In addition, composing elements identical to or corresponding to those in the above-described embodiments are given the same reference numerals, and a description of previously described elements is omitted.

The pet sheet 60 includes: an absorbing material 12 having a good water-absorption property for liquid such as urine; a hydrophilic top sheet 14 arranged so as to cover the absorbing material 12; an under sheet 20 having water repellency or water resistance, which is arranged so as to sandwich the absorbing material 12 between the under sheet 20 and the hydrophilic top sheet 14; a pair of flaps 16 and 18 arranged at peripheral edges or rims of the hydrophilic top sheet 14; and flaps 32 and 34 provided on the inner side of the flaps 16 and 18. Also, grooves 52 and 54 are formed at positions corresponding to the flaps 16 and 18 on the absorbing material 12 and the hydrophilic top sheet 14, and grooves 62 and 64 are formed at positions corresponding to the flaps 32 and 34.

The grooves 62 and 64 can also be formed by a method in which the absorbing material 12 is pressed with a roller, or by a method in which the thickness of the pulp forming the absorbing material 12 is decreased, or the like. Preferably, each of the grooves 62 and 64 are provided continuously without disconnection. When the grooves 62 and 64 are formed intermittently, the length of each of the grooves 62 and 64 is set to 30 percent or more of the length of each of the flaps 32 and 34. The width of each of the grooves 62 and 64 is, for example, set to 3 mm or more in a manner similar to the grooves 52 and 54. In addition, the grooves 62 and 64 are arranged so that a half of the width of each of the grooves 62 and 64 is covered with the flaps 32 and 34.

Figure 13:
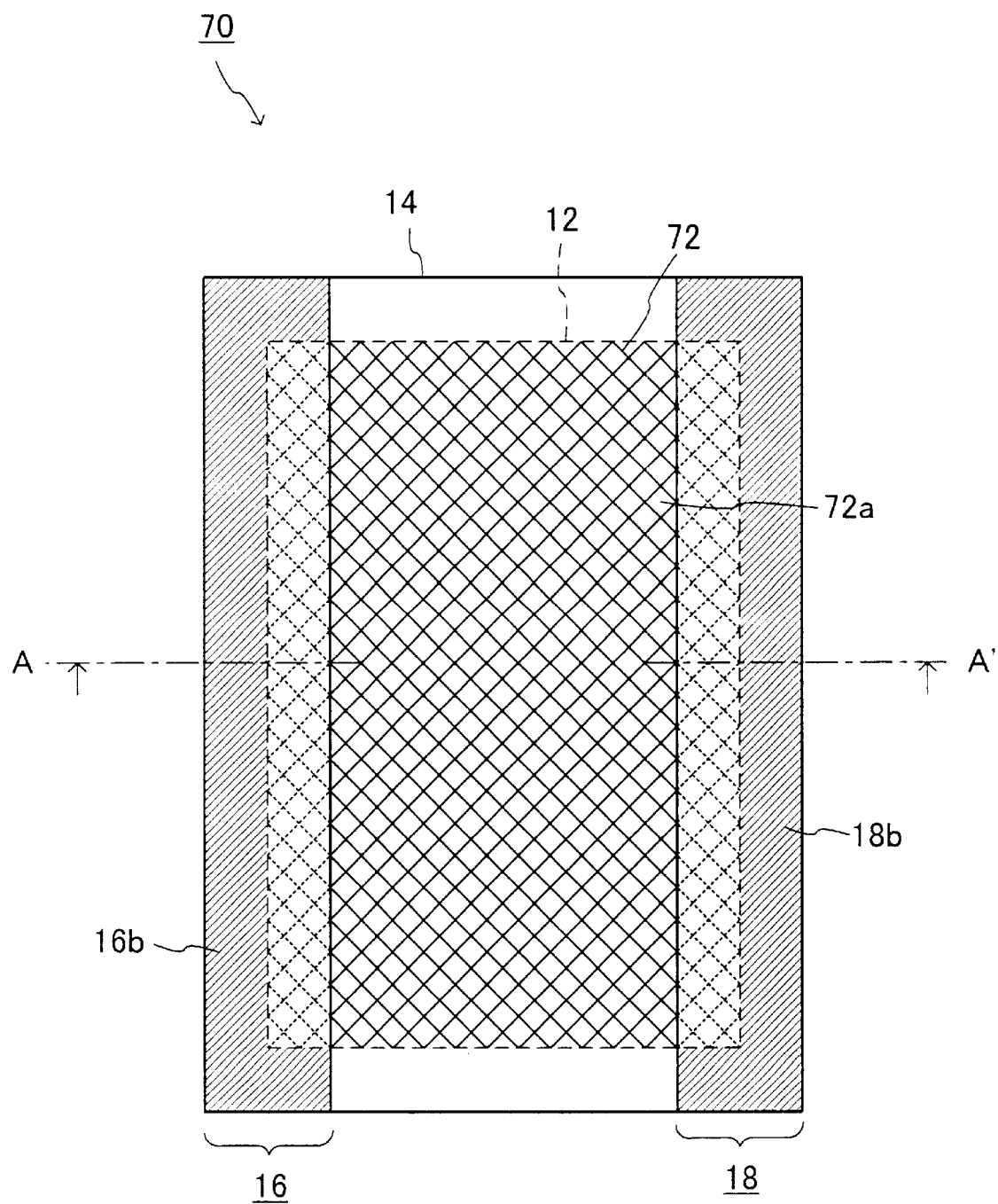
FIG. 13 is a plan view showing a structure of a pet sheet according to a sixth embodiment of the present invention.
Figure 14:
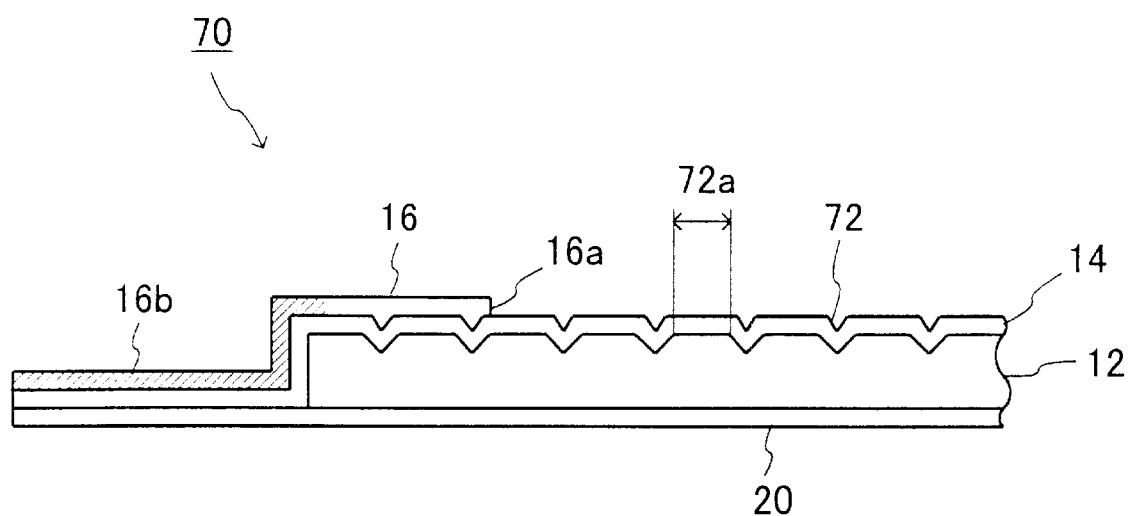
FIG. 14 is a partially sectional view taken on line A–A' of FIG. 13.

FIGS. 13 and 14 are a plan view and a cross sectional view, respectively, showing a pet sheet 70 according to a sixth embodiment of the present invention. The pet sheet 70 according to this embodiment is constructed so that the entire surface of the absorbing material 12 is subjected to an embossing process, based on the pet sheet 10 according to the first embodiment. In addition, composing elements identical to or corresponding to those in the above-described embodiments are indicated by the same reference numerals, and a description of previously described elements is omitted.

The pet sheet 70 includes: an absorbing material 12 having a good water-absorption property for liquid such as urine; a hydrophilic top sheet 14 arranged so as to cover the absorbing material 12; an under sheet 20 having water repellency or water resistance, which is arranged so as to sandwich the absorbing material 12 between the under sheet 20 and the hydrophilic top sheet 14; and a pair of flaps 16 and 18 arranged at the rims of the hydrophilic top sheet 14. Also, indentations 72 are formed on the entire surface of the absorbing material 12 so that a plurality of small areas 72a is formed on the absorbing materials 12. The indentations 72 can be formed by an embossing process in which the absorbing material 12 is pressed by rolling. Also, the indentations 72 can be formed not on the entire surface of the absorbing material 12, but on a part of the absorbing material 12. In this embodiment, although the plurality of small areas 72a which are provided by partitioning the absorbing material 12 into the indentations 72 are rectangular, it is not limited to this, and the areas may be triangular, polygonal, circular, elliptical, or the like.

In this embodiment, since the indentations 72 are formed on the absorbing material 12 so that the plurality of small areas 72a are formed, in whichever direction the urine in the small area 72a is going to flow, the urine is efficiently trapped by the nearby indentation 72. Thus, the movement of the urine can be controlled regardless of the direction of the flow of the urine. Furthermore, since the small areas 72a are formed on the entire surface of the absorbing material 12, the movement of the urine which slides and flows over the hydrophilic top sheet 14 can be controlled regardless of the position and the direction in which the urine is excreted.

Figure 15:
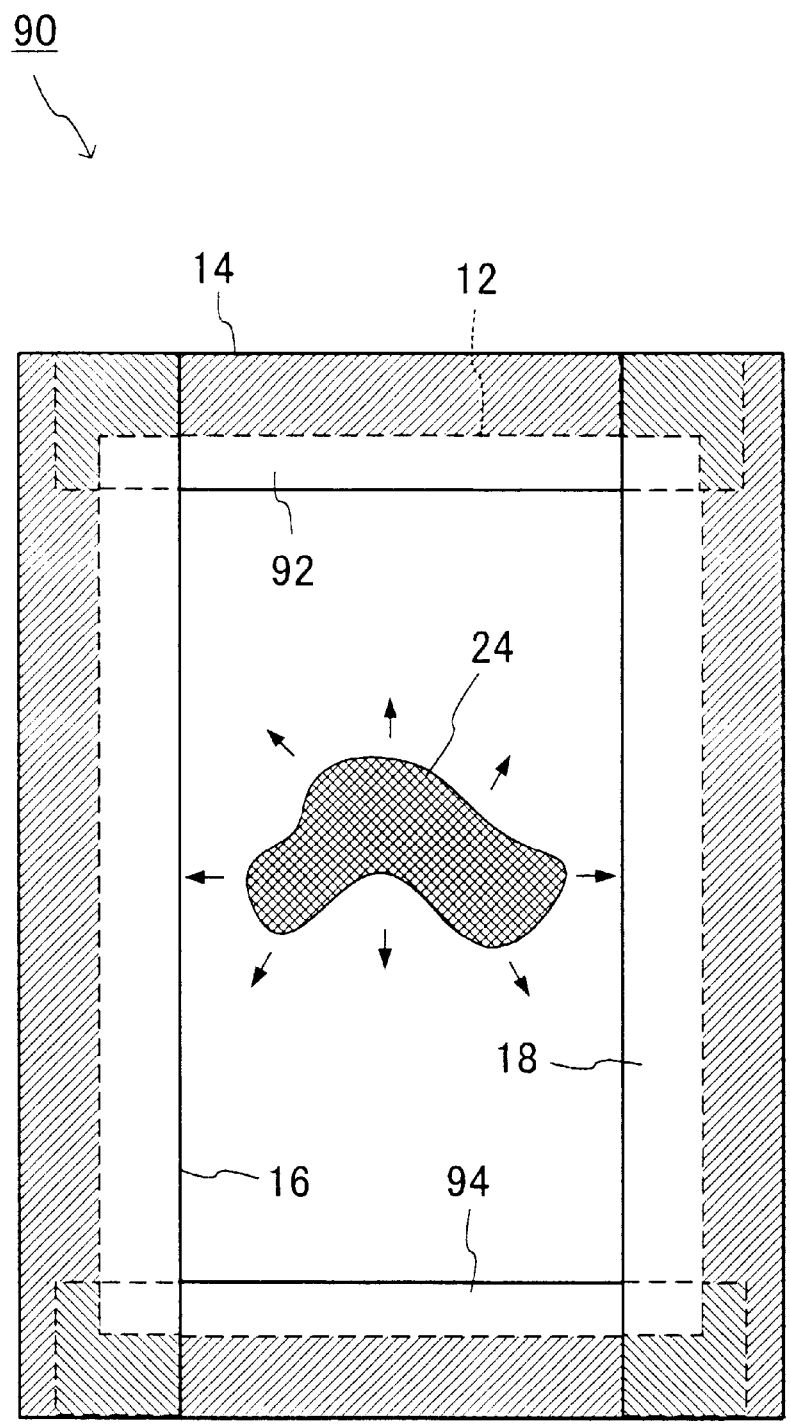
FIG. 15 is a plan view showing a structure of a pet sheet according to a seventh embodiment of the present invention.

FIG. 15 is a plan view showing a pet sheet 90 according to an eighth embodiment of the present invention. In the pet sheet 90 according to this embodiment, flaps 92 and 94 are additionally provided at each of the two short sides of the pet sheet 10 according to the first embodiment. In addition, composing elements identical to or corresponding to those in the above-described embodiments are given the same reference numerals, and a description of previously described elements is omitted.

The pet sheet 90 includes: an absorbing material 12 having a good water-absorption property for liquid such as urine; a hydrophilic top sheet 14 arranged so as to cover the absorbing material 12; an under sheet (not shown) having water repellency or water resistance, which is arranged so as to sandwich the absorbing material 12 between the under sheet 20 and the hydrophilic top sheet 14; and a pair of flaps 16 and 18 arranged at peripheral ends or rims on longer sides of the absorbing material 12 (hydrophilic top sheet 14); and a pair of flaps 92 and 94 provided at peripheral ends or rims of shorter sides of the absorbing material 12 (hydrophilic top sheet 14). The flaps 92 and 94 are adhered to the hydrophilic top sheet 14 in the same manner as the flaps 16 and 18.

Each of the flaps 92 and 94 preferably have an upper surface of hydrophilic and a lower surface of hydrophobic or water repellent as well as the flaps 16 and 18.

In this embodiment, since the flaps 16, 18, 92, and 94 are provided on the entire periphery of the pet sheet 90, leakage of the urine 24 can be prevented regardless of the direction of the flow of the urine 24. In addition, in this embodiment, although the grooves or the indentations are not formed in the absorbing material 12, the grooves and/or indentations (52, 54, 62, 64, and 72), which are adopted in the above-mentioned embodiments, can also be used. For example, the grooves can be formed along the flaps 16, 18, 92, and 94 on the entire periphery of the absorbing material 12.

Figure 16A:
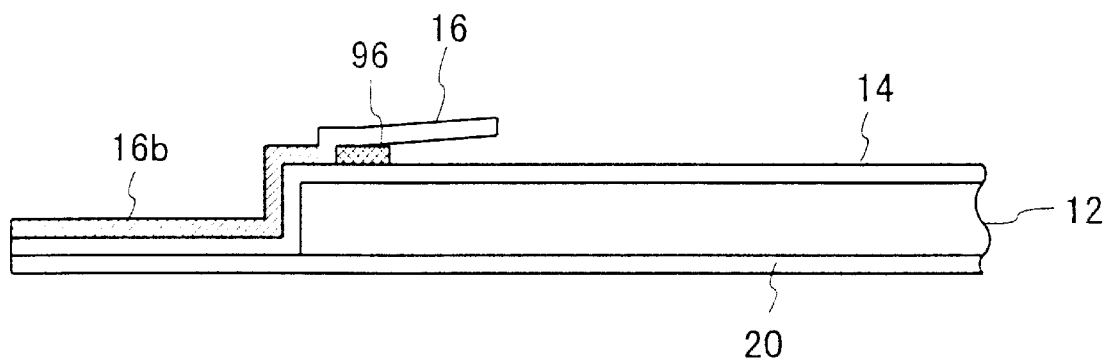
FIG. 16 is a partially sectional view showing a pet sheet according to an eighth embodiment of the present invention.
Figure 16B:
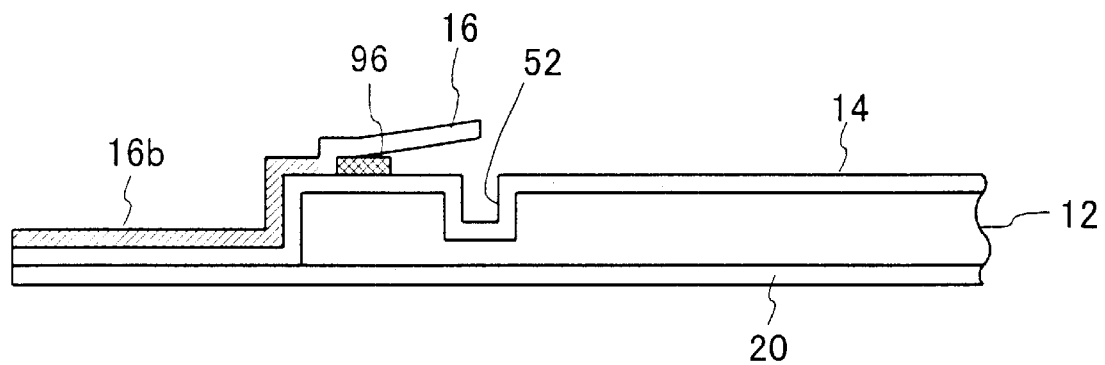

FIGS. 16A and 16B are cross-sectional views each showing a pat of a pet sheet according to an eighth embodiment of the present invention. A pet sheet, shown in FIG. 16A, further includes spacers 96 to the pet sheet 10 according to the above-described first embodiment, in which the spacers 96 are arranged between top sheet 14 and flaps 16 and 18. On the other hand, a pet sheet, shown in FIG. 16B, further includes spacers 96 to the pet sheet 50 of the above-described fourth embodiment, in which the spacers 96 are arranged between top sheet 14 and flaps 16 and 18. In addition, composing elements identical to or corresponding to those in the above-described embodiments are given the same reference numerals, and a description of previously described elements is omitted.

The spacers 96 form spaces between the top sheet 14 and flaps 16 and 18 so as to prevent the flaps 16 and 18 form being contact with the top sheet 14. As a result, urine 24 flowing over the top sheet 14 is securely trapped under the flaps 16 and 18, and therefore, urine 24 can be prevented effectively from being leaked out. The spacers 96 are not limited by specific shape and material, but it is required that the spacers 96 make enough spaces or room between the top sheet 14 and flaps 16 and 18.

Having described our invention as related to the embodiments, it is our intention that the invention not be limited to the foregoing embodiments, but many modifications and variations are possible within the spirit and scope of the appended claims. While the invention has been described in its preferred embodiments in the foregoing description, it may be possible that the embodiments are combined in various ways. For example, in the second to seventh embodiments, a spacer can be provided between each flap and top sheet. Grooves may be formed along the flaps arranged adjacent peripheral ends of the absorbing material 12 in the same embossing process forming the indentations 72 on the entire surface of the absorbing material 12.

According to the present invention, as described above, a flap has an upper surface of hydrophilic, so that urine put on the flap is absorbed therein. Therefore, it can be prevented that urine remained on a flap get users hands and/or a floor dirty.

What is claimed is:

1. A pet sheet comprising:
   an absorbing material having a good absorbing property for liquid, said absorbing material having side edges;
   a hydrophilic top sheet provided on the absorbing material;
   a flap having an upper surface that is hydrophobic, the flap being attached to a peripheral top edge of the top sheet and extending over the side edges of the absorbing material and configured so that an inward portion of the flap lifts upward from the top sheet to receive liquid there beneath.

2. A pet sheet according to claim 1, wherein
   said flap is made of a single sheet of non-woven fabric.

3. A pet sheet according to claim 2, wherein
   said flap has a lower surface which is coated with hydrophobic material or a water repellant material.

4. A pet sheet according to claim 1, wherein
   said flap is formed to have a double-layer structure including an upper layer that is hydrophilic and a lower layer that is hydrophobic or water repellant.

5. A pet sheet according to claim 1, further comprising:
   a spacer arranged between the hydrophilic top sheet and flap to make a space therein.

6. A pet sheet according to claim 1, wherein
   no extra intermediate material is provided between the hydrophilic top sheet and the flap, and the flap is maintained to be flat to the hydrophilic top sheet.

7. A pet sheet according to claim 1, wherein
   a plurality of the flaps are formed on the hydrophilic top sheet.

8. A pet sheet according to claim 7, wherein
   the flaps are formed on the entire surface of the absorbing material.

9. A pet sheet according to claim 7, wherein
   at least one end of each of the plurality of flaps adjacent peripheral edges of the absorbing material, which is opposite the free end thereof, is fixed to the hydrophilic top sheet in two dimensions.

10. A pet sheet according to claim 9, wherein
    wherein the absorbing material and the hydrophilic top sheet are generally rectangular; and
    the flap is provided along at least one side of the absorbing material and the hydrophilic top sheet, and the flap is fixed along an angular C shape.

11. A pet sheet according to claim 1, wherein
    an indentation is formed at least at a position corresponding to the flap adjacent peripheral edges of the absorbing material.

12. A pet sheet according to claim 11, wherein the indentation is a groove formed to extend along the flap.

13. A pet sheet according to claim 12, wherein
    the flap is formed so as to cover a part of the groove.

14. A pet sheet according to claim 11, wherein
    a plurality of small areas is formed on the absorbing material by being partitioned by a plurality of the indentations.

15. A pet sheet according to claim 14, wherein
    the small areas are formed on the entire surface of the absorbing material by the indentations.

\* \* \* \* \*